Figure 1:
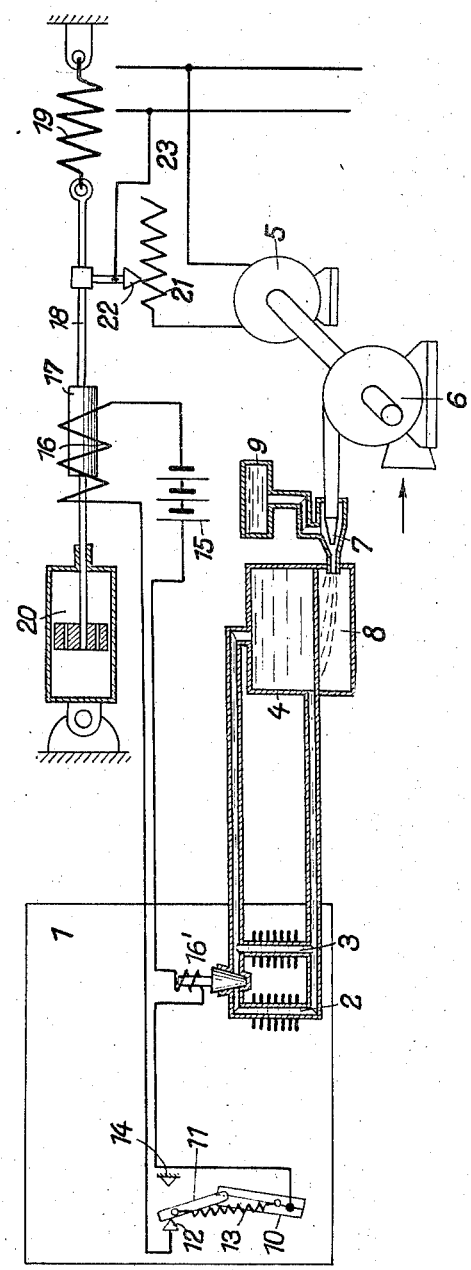

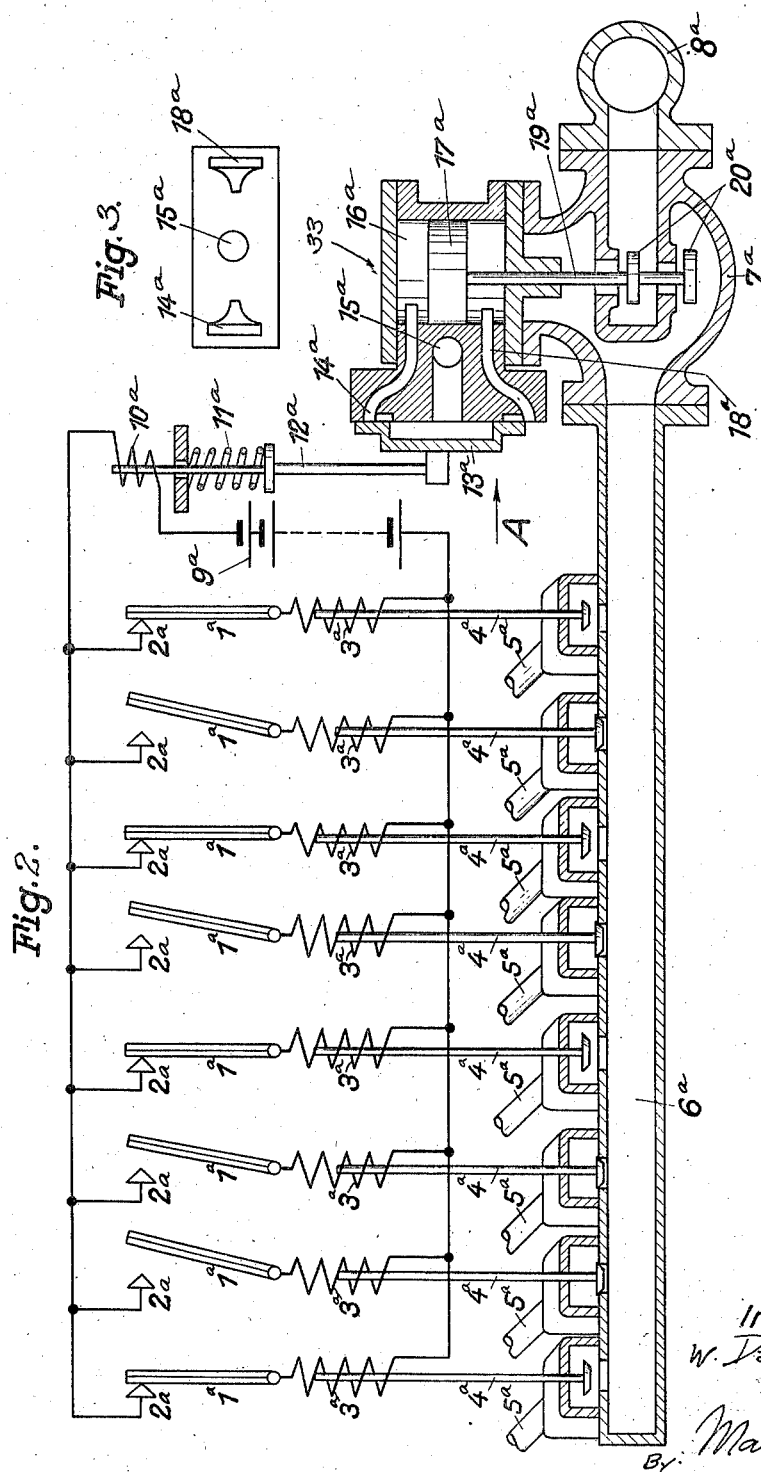

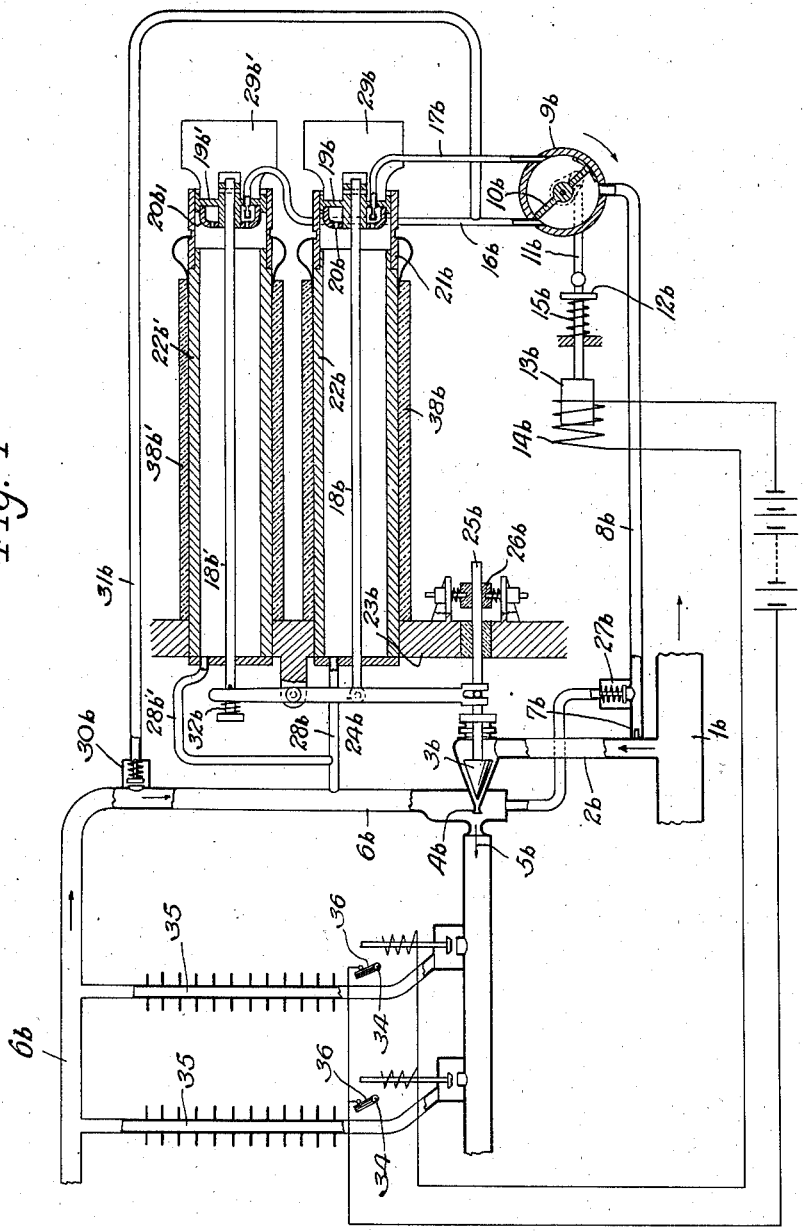

Patented May 31, 1938

2,119,153

UNITED STATES PATENT OFFICE 2,119,153

REGULATION OF STATE VALUES

Walter Dällenbach, Berlin-Charlottenburg, Germany, assignor to N. V. Machinerieen-en Apparaten Fabrieken "Meaf", Utrecht, Netherlands Application July 27, 1934, Serial No. 737,298
In Germany June 20, 1933

11 Claims. (Cl. 236—1)

This invention relates to a method and device for regulating state values.

The invention deals generally with the regulation of state values, such as temperature, pressure, height of liquids, number of revolutions, electric currents, voltages, or the like, in which the intensity of a process causing an increase in the value of a state, as for instance, the supply of heat, gas, liquid, the increase in voltage, or the like, occurs intermittently between an upper and lower limit value, which process will be referred to throughout the specification as "primary regulation", and has for its special object the automatic alteration of at least one of the two limit values, which is referred to below as "secondary regulation".

The invention is of special importance for automatic heating, particularly of railroad cars, and also for plant hot houses and the like.

A further object of the invention is to render the secondary regulation dependent upon the velocity of change in the value of the state, i. e., the temperature, the pressure of the height of the liquid, or the like, in time intervals during which the process, owing to primary regulation, is at the one intensity stage, particularly the lower one.

A further object is to render the secondary regulation directly dependent upon the length of the time intervals during which the regulating process, owing to primary regulation, is at the lower or upper intensity stage.

A further object of the invention is to arrange the secondary regulation so that the time intervals of the intermittent primary regulation are as much as possible alike.

A further object of the invention is to influence secondary regulation in dependence upon the mean value in time of the position of the primary regulator or regulators, or to make it dependent thereupon.

Another object of the invention is to maintain the mean time value of primary regulation by means of media which possess inertia or friction, such as inert masses, oil brakes, or the like, for preventing rapid motion of the regulating member.

Another object of the invention is to influence a single joint secondary regulation by means of a plurality of primary regulators.

Another object of the invention is to control secondary regulation by an expansion member whose expansion according to its temperature is varied by positioning the member in the flow of at least one medium of high or low temperature and providing for the quantitative regulation of at least one of these media.

A further object of the invention is to cause the medium which heats or cools the expansion member to fulfill its two tasks, namely, the establishment of a force transmitting connection between the expansion member and the regulator and the deformation of the expansion member chiefly at different times.

A still further object of the invention is to establish the force transmitting connection between the regulator and the expansion member by means of the medium which heats or cools the latter in such a way that the expansion member, as for instance, a tube made of material possessing great thermal expansion, is firmly connected with another member showing a lesser degree of thermal expansion, as for instance, another tube, and that an expansion member made of material possessing great thermal expansion and being firmly connected for a time with the regulator holds or releases the tube capable of less thermal expansion by its deformation following temperature.

By way of example, the invention is illustrated in the accompanying drawings, in which Figure 1 is a view of a heating plant with combined primary and secondary regulation; Fig. 2, a diagrammatic view of an arrangement of secondary regulation adapted particularly for railroad cars; Fig. 3, a detail view of a slide valve; Fig. 4, a diagrammatic view of a special type of secondary regulation by means of expansion members.

Further details of the invention are fully described below.

It is assumed that the following conditions prevail: A room is heated by a plurality of heating elements, some of which are capable of being disconnected. Now if some of the heating elements are disconnected by temperature regulators such as bimetal strips or thermostats, the degree of efficiency of the apparatus will be less when there is less demand for heating energy. If, however, the temperature regulator is caused to act on the heat producer, this takes place only slowly owing to its great inertia. Moreover, this system is impracticable when a number of rooms with a varying demand for heating energy have to be heated.

The system according to the present invention regulates the room temperature by connecting and disconnecting heating elements (primary regulation) and influences the steam producer in accordance with the entire demand for heating energy (secondary regulation). This regulation may be effected by increasing the heat production continuously or intermittently when the intervals of disconnections are short as compared with the heating duration (static regulation) or it may be effected in that the secondary regulation is adapted to keep the intervals of disconnection constant (astatic regulation). Members operating with inertia or friction may be provided in the regulator such as an oil cataract which equalize sudden changes of load. In the case of static regulation, there is associated with each time difference between cooling and heating interval a certain adjustment of the secondary regulator but a certain rate of change of the secondary regulator in the case of astatic regulation. The system is obviously applicable to the heating of several rooms, the regulation being made dependent on the relative number of simultaneously heated rooms. If the demand for heating energy for the rooms varies, it is advisable to combine the action of the temperature regulator on the secondary regulator with a weight.

It is obvious that this regulating method is not limited to temperature, heat supply and heating but can be generally applied wherever a state value is to be kept within certain limits by intermittent changing of a process and where for any reason the intensity stages between which the intermittently varying process is to be changed over are to be subjected to an additional regulation. As an example, the regulation of a hot water heating system will be described below (see Figure 1).

Referring to Fig. 1, in the room 1 to be heated, two heating elements 2 and 3 are installed which are supplied with hot water from the boiler 4. The latter is fired with a mixture of oil and air which is produced when the compressor 6 driven by the motor 5 blows air through a nozzle 7 into the combustion space 8 and the air, by its injector effect, draws in the oil required for combustion from the vessel 9.

The room 1 contains also a thermostat 10 provided with a rocking lever 11 which functions so that, when a certain temperature has been reached, it will be pressed by the spring 13 against the contact 12 and remain in this position until at a certain change in temperature the thermostat 10 has turned to the left to such an extent that the spring 13 can draw the lever 11 to the right against the stop 14. When the room temperature has reached its lower limit, it is assumed in this example that the lever 11 will strike the contact 12 to close the circuit of battery 15 and to open the magnetically actuated valve 16' so that both heating elements become effective. This upper intensity stage of heating will prevail until the upper temperature limit is attained in the room 1 and the rocking lever 11 of the thermostat 10 interrupts the current and thus closes the valve 16' and renders the heater 2 inoperative whereby heating is brought to its lower intensity stage (primary regulation).

A measure for the demand for heating energy is furnished by the cooling speed as well as by the heating speed, or by the time interval during which heating is at the lower intensity stage and by the time interval during which heating is at the upper intensity stage. This interval is used in the present instance for regulating the heating of the hot water boiler 4 and thus for regulating the heating energy supplied (secondary regulation) in the following manner: As long as the upper intensity stage is maintained, the circuit of the battery 15 is closed and the magnet coil 16 attracts the core 17 and thus the rod 18 against the action of the spring 19. As, owing to the great inertia of the oil brake 20 connected with the rod 18, all impulses of the force of the magnet 16 are united over several time intervals to a mean force which increases with the maintenance of heating at the upper intensity stage, each value of this time interval will be associated with a certain position of the rod 18. Each position of the rod 18 is associated with a certain value of the resistance 21 switched into the circuit 23 of the motor 5 by the contact 22, and thus with a certain motor output, a certain compressor output, a corresponding heating of the boiler 4 and a certain intensity of the heat supply.

There exists, therefore, a direct static connection between the length of the heating intervals (upper intensity stage) and the degree of heating. In the example described, the secondary regulation alters both intensity stages of the heat supply, in a constant manner.

As a further example the regulation of a steam heating system for railroad cars will be described with reference to Fig. 2.

In each compartment a thermostat 1ª of known type is disposed which closes the contact 2ª when the temperature is too low, so that the magnet coil 3ª will open the valve 4ª, with the result that the heater 5ª is supplied with steam by the main piping 6ª of the car, steam being supplied to the piping 6ª by means of the main relay 7ª representing the steam supplier that has to be regulated secondarily by the pipe 8ª. The more thermostats 1ª simultaneously touch their contacts 2 and the more compartments will therefore be heated simultaneously and require heating steam, the more current flows from the train lighting battery 9ª through the magnet coil 10ª and the more forcefully will this coil attract the slide rod 12ª against the action of the spring 11ª and the farther will the slide 13ª open the channel 14ª. The farther the cross section of the channel 14ª is opened, the more quickly will the controlling medium, e. g., steam, compressed air, or the like, flow from the supply 15ª into the cylinder 16ª and the more forcefully will the servo-piston 17ª be depressed, the control steam already present in the other half of the cylinder escaping through the duct 18ª. Corresponding to the piston motion, the cross sections uncovered by the valve discs 20ª in the main valve 7ª will be enlarged by means of the rod 19ª, and more heating steam will be supplied. The temperature in the compartments will rise, reach the upper limit in some of them, and their thermostats will open the contacts 2ª. As a result, the current in the coil 10ª will decrease and the spring 11ª depress the slide 13ª to such an extent that the channel 14ª will be shut off and the control steam flow through the duct 18ª into the cylinder 16ª and push up the piston 17ª until, owing to the throttled heat supply, the temperature in the compartment has dropped so far that some thermostats will operate again. At uniform operating condition, that is, when the cooling and heating intervals have the same length and, correspondingly, there is always the same number of open and closed contacts 2ª, the slide 13ª will remain in middle position and close both channels 14ª and 18ª so as to hold the piston 17ª in the position which insures the supply of the desired amount of heat.

The speed of regulation and the quantity of heating energy supplied per time unit increase with the number of simultaneously closed contacts $2^a$ and vice versa decrease when the number of simultaneously closed contacts decreases. This has been termed above the astatic regulation or secondary regulation of the upper intensity stage of the heat supply.

Since in view of the relatively small number of compartments and the widely varying external influences on the state of heat it cannot be expected that the resultant electric current of the control system represents at each instance a mean free from peak values, a retarding member 33 is interposed between the magnet coil $10^a$ actuated by the current and the member $7^a$. The retarding member comprises, as stated, the slide $13^a$, the cylinder $16^a$ and piston $17^a$, and the channels $14^a$ and $18^a$ which connect the slides and cylinders are so constructed at the slide face that with the increasing deviation of the slide from its middle position the passage of the control steam and thus the heat supplied to the compartments will be progressively altered, which is effected by having the channels $14^a$ and $18^a$ increase in width from the center of the slide towards the outside, as indicated in Fig. 3. At slight deviations of the slide from central position the amount of control steam flowing into the cylinder will, therefore, be so small that it can move the piston only after the slide has remained for a long time in the same position or frequently repeated the same deviation, whereas in case of considerable deflections of the slide, e. g., during heating of the car when all thermostats hold their contacts closed, a large or the full cross section of the channel $14^a$ will receive control steam and thus instantly cause the piston $17^a$ to open the member $7^a$ to a large extent, or completely.

In connection with the regulating process described the following two limiting cases are possible:

(1) At relatively high outer temperature the main piping $6^a$, which is also passed through the compartments, can supply the car with more heat than required. In all compartments the thermostats $1^a$ will then open the contact $2^a$ and close the valve $4^a$. The coil $10^a$ will become currentless, the spring $11^a$ will guide the slide $13^a$ into the lowermost position and the member $7^a$ will be completely shut off and remain so until in the cooling car more than one-half of the thermostats have closed the circuit again.

(2) At a very low outer temperature the cross sections of the steam supply may not suffice for supplying enough steam for the intermittent heating of the compartments. All thermostats will then make contact and the magnet 10 of the main regulator will draw the slide $13^a$ into extreme position whereby the member $7^a$ will be fully opened. As all individual valves will be open also, heating will not be intermittent any more but continuous and, within the same time, the double quantity of steam will be available as in average operation for which the plant is intended.

When the upper temperature limit will then be reached in some compartments, the individual thermostats alone will operate, and only after more than one-half of all thermostats have closed the circuit, will the main regulator $7^a$ become active.

It is to be understood that the current in the coil $10^a$ is the stronger and thus the control slide $13^a$ is shifted to a greater degree the greater the number of thermoswitches $1^a$, $2^a$ are closed. If, as shown on Fig. 2, the control slide assumes approximately the central position with respect to the passages $14^a$ and $18^a$, the valve $7^a$ will, as a matter of fact, be opened to a greater degree as more thermoswitches are closed. On the contrary, it is different with the case referred to in case (2) above wherein, as a result of the stimulation of nearly all the thermostats $1^a$, $2^a$, slide $13^a$ is completely raised. In this case the lower closure member of the slide $13^a$ is approximately exactly between the two openings of the passages $15^a$ and $18^a$. The passage $18^a$ is then completely free, that is, connected with the atmosphere, while steam can pass into passage $14^a$ for displacing piston $17^a$. If, now, some of the heat switches $1^a$, $2^a$ are opened, the current subsides in coil $10^a$ and slide $13^a$ moves downwardly somewhat. Valve $7^a$ itself is, however, not shifted thereby, as the connection between the steam passage $15^a$ and the steam passage $18^a$ is not yet established, and as a result steam cannot pass below piston $17^a$ and raise it. Only when substantially half of all the thermostats $1^a$, $2^a$ is again opened and slide $13^a$ begins to pass beyond its central position is communication between the passages $15^a$ and $18^a$ reestablished; and then only can valve $7^a$ be shifted or displaced.

If rooms of different size have to be heated or rooms require different temperatures, corresponding resistances may be provided in the branch circuits, so that when the various thermostats make contact the currents will differ in intensity and influence the main regulator differently.

Electric heating is carried out with the same fundamental arrangement, with the difference, however, that the steam valves are supplanted by electric switches.

In addition to railroad heating, the invention may be applied to the heating of houses and rooms of all kinds, and can also be profitably used for regulating compressed air plants, gas and water supply, speeds, electric quantities, and the like.

The advantages of the above-described method with respect to the construction shown in Fig. 2 are as follows:

A main regulator automatically supplies the entire car with exactly the amount of heat which is actually required.

Control of the main regulator is effected without the interposition of measuring instruments and thus avoids all sources of error connected therewith.

Regulation is independent of the magnitude of the output to be supplied and of the height of temperature, in so far as the limits imposed by cross sections, deflection of thermostats, are not exceeded.

The main regulator is neither mechanically stressed by small peaks nor unnecessarily influenced in its motion.

The speed of regulation increases with demand.

The regulation is capable of supplying heat to rooms differing in operating conditions, such as different heat requirements and different temperatures.

A further important example will be described with reference to Fig. 4.

As large forces are required for regulating the steam supply according to the relatively high pressures up to 4 atmospheres, it appears to be most appropriate to cause the motion by thermal expansion, e. g., of a metal tube. If low pressure steam is used for heating the tube, its quantity can be controlled by a simple valve that can be operated with slight forces and electromagnetically controlled from the compartments.

The other task of the valve is to insure full utilization of the heating steam, and this is effected by a small valve controlled by overpressure or the temperature of the steam (steam-air mixture), which permits part of the steam to flow into an expansion pipe of the steam supply regulation and thereby influences the valve in the same way as if in normal operation the live steam supply had to be throttled owing to excessive temperatures in the compartments.

In the examples described static and astatic regulation was possible. In case of static regulation each demand for energy would be associated with a certain opening of the control steam piping, regardless of the considerably fluctuating steam pressure in railroad heating. It is, therefore, advisable as a rule to adopt astatic regulation which associates each change in the demand for energy with a certain speed of change of the regulator and influences it until, independently of steam pressure, temperature, and the like, the necessary amount of heat is supplied.

This regulating method is of course not restricted to heating, but can be applied for regulating the supply of all media that are capable of flowing.

One of the objects of the invention is therefore the regulation of the supply of a flowing medium by means of a regulator controlled by an expansion member, the expansion of which, according to the invention, is varied corresponding to its temperature by the arrangement of the member in the flow of at least one medium of high or low temperature, one of which media at least is regulatable as to quantity.

According to the invention, regulation is carried out so as to cause two expansion members of same type to act on the regulator alternately and in opposite directions. For this purpose, the two members are positively coupled only temporarily with the regulator.

Coupling and uncoupling is effected, according to the invention, by other expansion members which are surrounded by the same medium that influences the first members, the two different expansion members forming a system and being influenced at different times.

The medium influencing the expansion members is controlled according to the invention in such a way that only one of the expansion members actuating the regulator is coupled therewith at a time and adjusts it according to deformation. This control takes place only in media having almost atmospheric pressure and can thus be effected with feeble forces.

As an example, the regulation of train heating with reference to Fig. 4 will be described below.

From the steam piping $1^b$ passing along the entire train each car receives through the branch pipe $2^b$ the amount of live steam adjusted by the valve $3^b$, which will be fully expanded on coming out of the nozzle $4^b$ and flow into the heating piping $5^b$ of the car. The heating medium flows from the nozzle $4^b$ into the main heat passage of the railway vehicle and from there through the valve $34$ controlled according to the compartment temperature through thermostat $36$ into the heat pipe $35$ of the individual car compartments, where it gives off its heat to great degree. The unconsumed steam flows further through pipe $6^b$ and passes to the valve $3^b$, where the injector stream of the nozzle $4^b$ again carries it into the heating circuit. The branch pipe $2^b$ contains a nozzle $7^b$ which permits some fully expanded steam to flow through the pipe $8^b$ into the slide $9^b$. The position of the control member $10^b$ in the slide $9^b$ is influenced by means of the rods $11^b$ and $12^b$ and the magnet core $13^b$ by the windings of the coil $14^b$ through which the current of the compartment regulators $34$ flows and which acts against the pressure of the spring $15^b$. For example, if it is too cold in the compartments, the cooling intervals, as described in connection with the intermittent heating according to Figs. 1 and 2, will be shorter than the heating intervals, so that the current flowing through the coil $14^b$ will be, on the average, quite strong, attract the core $13^b$ and the rods $12^b$ and $11^b$ against the action of the spring $15^b$ and thus turn the control member $10^b$ in the direction of the arrow. The control member $10^b$ will first close the pipe $8^b$ and then open it again to guide the steam through the pipe $17^b$ and cut off the pipe $16^b$. The pipe $17^b$ passes the steam through the wheel-like expansion member $19^b$ firmly keyed to the rod $18^b$ into a space formed by the member $19^b$ and the plate $20^b$ and heats it to such an extent that it will quickly expand to a considerable degree and hug the invar pipe $21^b$. The steam passes then slowly through the small holes in the plate $20^b$ into the large aluminum pipe $22^b$ and heats it also. The pipe $22^b$ is firmly arranged with its left-hand end in the frame $23^b$ and expands therefore to the right. During its expansion the pipe $22^b$, being rigidly connected with the invar pipe $21^b$, takes along the latter as well as the expansion member $19^b$ pressed thereon and the rod $18^b$ made of a material having a low thermal expansion coefficient, especially invar. By means of a lever $24^b$ disposed in the frame $23^b$ the motion of the rod $18^b$ is increased and transmitted by the spindle $25^b$ to the valve $3^b$ which thus enlarges its steam supply passage and admits more heating steam. The cooled steam is drawn off from the pipe $22^b$ by means of the nozzle $4^b$ and the pipes $6^b$ and $28^b$.

When sufficient steam supply has thus been provided, the control current will drop to its mean value, adjust the control member $10^b$ to middle position and cut off the regulating steam. To prevent the valve $3^b$ from being closed again by the cooling of the pipe $22^b$, it represents a relatively large mass and is insulated as at $38$ against heat, whereas the very light expansion member $19^b$ is provided with large cooling surfaces $29^b$, so that it will cool off quickly and dissolve its connection with the pipe $22^b$ before the latter has been essentially shortened.

The excess pressure valve $27^b$ makes it impossible for the pressure in the pipe $8^b$ to rise while the control member $10^b$ is in middle position.

As the expansion members will not hold the valve rods when in cooled condition, a friction brake $26^b$ is arranged on the valve spindle $25^b$ to prevent any adjusting effect of vibrations, or the like.

Small deviations of the control member $10^b$ from its middle position do not influence the regulation, as considerable deviations are required before the pipe $8^b$ will be opened by the broad end of the member $10^b$.

If for any reason too much heating energy is supplied, the magnet $14^b$ will push the control member 10ᵇ into the position shown in Fig. 4; in the second expansion pipe the same process goes on as in the first pipe, and the valve 3ᵇ is closed by the expansion thereof.

The elements in the second expansion pipe 22ᵇ′ correspond to the elements in the first expansion pipe 22ᵇ, and are separately indicated by the prime mark on the letter b after the corresponding numerals.

Should, during sudden temperature jumps, an expansion member be heated with steam before, in the other system, the expansion member 19ᵇ can cool off and sever its connection with the other expansion pipe, damage to the rods will be prevented by the spring 32ᵇ which connects the second control rod 18ᵇ′ with the lever 24ᵇ.

To prevent excess pressure in the heating system, particularly when cold cars are heated by too much live steam, the pipe 6ᵇ contains a relief valve 30ᵇ which guides the steam through the pipes 31ᵇ and 16ᵇ to the expansion pipe which throttles the steam supply by its elongation.

This regulating method affords the following advantages:

Without employing sensitive mechanical parts or measuring instruments, the supply of a heating medium can be controlled both as to the temperature of the room to be heated and its variation (static and astatic regulation). The possibility of astatic regulation involves the special advantage of adapting the steam supplied to the heating elements to the demand only, regardless of pressure and temperature, which is effected by causing the control member 10ᵇ to occupy its middle position as soon as, on the average, the heating time in the compartments is equal to the cooling time, whereby the resultant current of all thermostats influences the member 10ᵇ with its mean value. This middle position is therefore independent of the kind of inflowing steam, as it can be brought about at any position of the regulator.

Furthermore, this method makes it possible to control regulators in high pressure pipings, which require great forces for their adjustment, by a very feeble force, as the controlling parts move approximately at atmospheric pressure.

The regulating method described may be applied where hot liquids, steam or gases are to be supplied in regulatable quantities, particularly in the chemical industries, or where relatively cold media are concerned, as in the refrigerating industry.

Where hot liquids or vapors are available it might further be economical to regulate with their aid the supply of media which are capable of flowing, especially when they are under high pressure, no matter what temperature they may have themselves.

I claim:—

1. In an arrangement for heating an enclosed space comprising a heating medium flowing in a line through said space, a primary regulator consisting of a thermostat subject to the temperature of said space, valve means in said line for increasing or retarding the flow of said medium, means connecting said thermostat and said valve means whereby the latter is responsive to changes in the former, continually operating means for heating said medium, a secondary regulator adapted to increase or diminish the speed of heating of said medium per time unit, said secondary regulator being controlled within limits above zero by said primary regulator.

2. Arrangement for regulating the heating of a room according to claim 1, a braking member, said secondary regulator being coupled to said braking member and being delayed thereby to cause the admission of an increasing amount of heating medium into said line in accordance with an increasing frequency and duration of operation of said primary regulator as influenced by the temperature of said space per time unit.

3. In an arrangement for regulating the temperature of a plurality of enclosed spaces, comprising a main supply line, at least one heat radiating member in each space, a plurality of lines for conducting a flowing heating medium connected to said members and said main supply line, a primary regulator consisting of thermostats subject to the temperature of said spaces, valve means in each of said lines adjacent said heat radiating members for increasing or retarding the flow of the medium, means connecting each of said thermostats to said valve means in the respective lines whereby the latter is responsive to changes in the former and a single secondary regulator adapted to control continuously the quantity of heat delivered to said main supply line, said secondary regulator being responsive to the combined action of any number of primary regulators.

4. In an arrangement for regulating a room temperature at least one heating element to which a heating agent is supplied through a pipe, an intermittently operating primary regulator sensitive to the room temperature and adapted to vary the heat supplied to the heating element between an upper and a lower stage, a secondary regulator adapted to vary continuously the heat supplied to the primary regulator and the heating element, and means for displacing the secondary regulator according to the operation of the primary regulator.

5. In an arrangement for regulating a room temperature at least one heating element to which a heating agent is supplied through a pipe, a valve in the heating agent feed which permits variation of the heat supplied to the heating element intermittently between an upper and a lower value, a primary regulator consisting of a thermostat sensitive to the room temperature and means for actuating said valve dependent on the operation of the thermostat, a secondary regulator for displacing a main valve which is adapted to vary continuously the heat supplied to the valve of the primary regulator through the pipes, and means for continuously actuating the secondary regulator dependent on the number and the duration of the operations of the primary regulator.

6. An arrangement for regulating a room temperature comprising at least one heating element supplied with a heating medium by a pipe, a valve in said pipe intermittently controlling the amount of heating medium supplied to said heating element, a primary regulator consisting of a thermostat actuated by the room temperature and an electromagnet actuating said valve, said electromagnet having an exciting circuit controlled by said thermostat, a secondary regulator adapted to control continuously the amount of heating medium supplied to said pipe, an electromagnet controlling said secondary regulator, and said electromagnet of the secondary regulator having an exciting circuit electrically connected to said exciting circuit of said electromagnet of the primary regulator.

7. In an arrangement according to claim 3, an electromagnet connected to said valve means, an exciting coil for said magnet controlled by said means connecting each of said magnets with said valve means, an electromagnet connected to said secondary regulator, said second named magnet having an exciting coil, an electrical means connecting the exciting coil of the secondary regulator with said exciting coil of each valve means.

8. In an arrangement for regulating a room temperature, at least one heating element supplied with steam through a pipe, an intermittently operating primary regulator responsive to room temperature controlling valve means regulating the amount of steam supplied to said heating element, a secondary regulator controlling the amount of steam supplied to said pipe by actuation of a second valve in said pipe, said secondary regulator comprising an electromagnet responsive to said primary regulator, two expansion members coupled to said second valve, and an auxiliary valve controlled by said electromagnet of said secondary regulator, said auxiliary valve being adapted and arranged to conduct said steam either into one or the other of said expansion pipes.

9. An arrangement for regulating a room temperature according to claim 8, rod means connecting said second valve with said expansion members, said expansion members comprising cylindrical metal pieces having a large coefficient of expansion positioned within tubes having a low coefficient of expansion, said metal pieces being adapted upon heating thereof to press tightly against the inner walls of said tubes, and to be loosed therefrom immediately upon cooling.

10. An arrangement for regulating a room temperature according to claim 8, an exhaust pipe connected to said heating element, an excess pressure valve in said exhaust pipe and connected to one of said expansion pipes, said pressure valve being adapted to allow the exhaust steam to pass at an increased pressure into said expansion pipe, said expansion pipe being responsive to said exhaust steam to close said second valve.

11. In an arrangement for regulating the temperature of a plurality of enclosed spaces provided with individual heating elements heated by steam passing through a supply pipe into said heating elements, a primary regulator in each space, means controlled by said primary regulator to change the supply of steam to said heating elements, a single secondary regulator for all of said spaces, a throttle valve responsive to said primary regulator and positioned in said supply pipe and continuously controlling the amount of steam flowing through said supply pipe, said throttle valve comprising a piston actuated by steam from said pipe and a control slide actuated by said secondary regulator.

WALTER DÄLLENBACH.